(12) United States Patent
Ito

(10) Patent No.: US 11,204,665 B2
(45) Date of Patent: *Dec. 21, 2021

(54) INPUT DEVICE HAVING REDUCED ELECTROMAGNETIC INTERFERENCE

(71) Applicant: Synaptics Incorporated, San Jose, CA (US)

(72) Inventor: Daisuke Ito, Tokyo (JP)

(73) Assignee: Synaptics Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/166,279

(22) Filed: Feb. 3, 2021

(65) Prior Publication Data

US 2021/0157440 A1    May 27, 2021

Related U.S. Application Data

(63) Continuation of application No. 16/533,477, filed on Aug. 6, 2019, now Pat. No. 10,955,967.

(51) Int. Cl.
    *G06F 3/041*      (2006.01)
    *G06F 3/044*      (2006.01)

(52) U.S. Cl.
    CPC .......... *G06F 3/0418* (2013.01); *G06F 3/0412* (2013.01); *G06F 3/0446* (2019.05)

(58) Field of Classification Search
    CPC ..... G06F 3/0418; G06F 3/0446; G06F 3/0412
    See application file for complete search history.

(56) References Cited

U.S. PATENT DOCUMENTS 10,955,967 B2 *   3/2021   Ito ..................... G06F 3/0412
2015/0091849 A1    4/2015   Ludden \* cited by examiner

*Primary Examiner* — Kenneth B Lee, Jr.
(74) *Attorney, Agent, or Firm* — Leydig, Voit & Mayer, Ltd.

(57) ABSTRACT

An input device comprises a plurality of data lines of a display panel, a plurality of sensor electrodes, and a processing system. The processing system drives a sensor electrode with a sensing signal during a first portion of a non-display update period of a display frame. In certain embodiments, a source driver of the processing system drives a data line with a first constant voltage during at least one of a second portion of the non-display update period and a third portion of the non-display update period. In certain embodiments, the source driver outputs a guard signal during the first portion of the non-display update period. The first portion of the non-display update period occurs after the second portion of the non-display update period and before the third portion of the non-display update period.

20 Claims, 5 Drawing Sheets

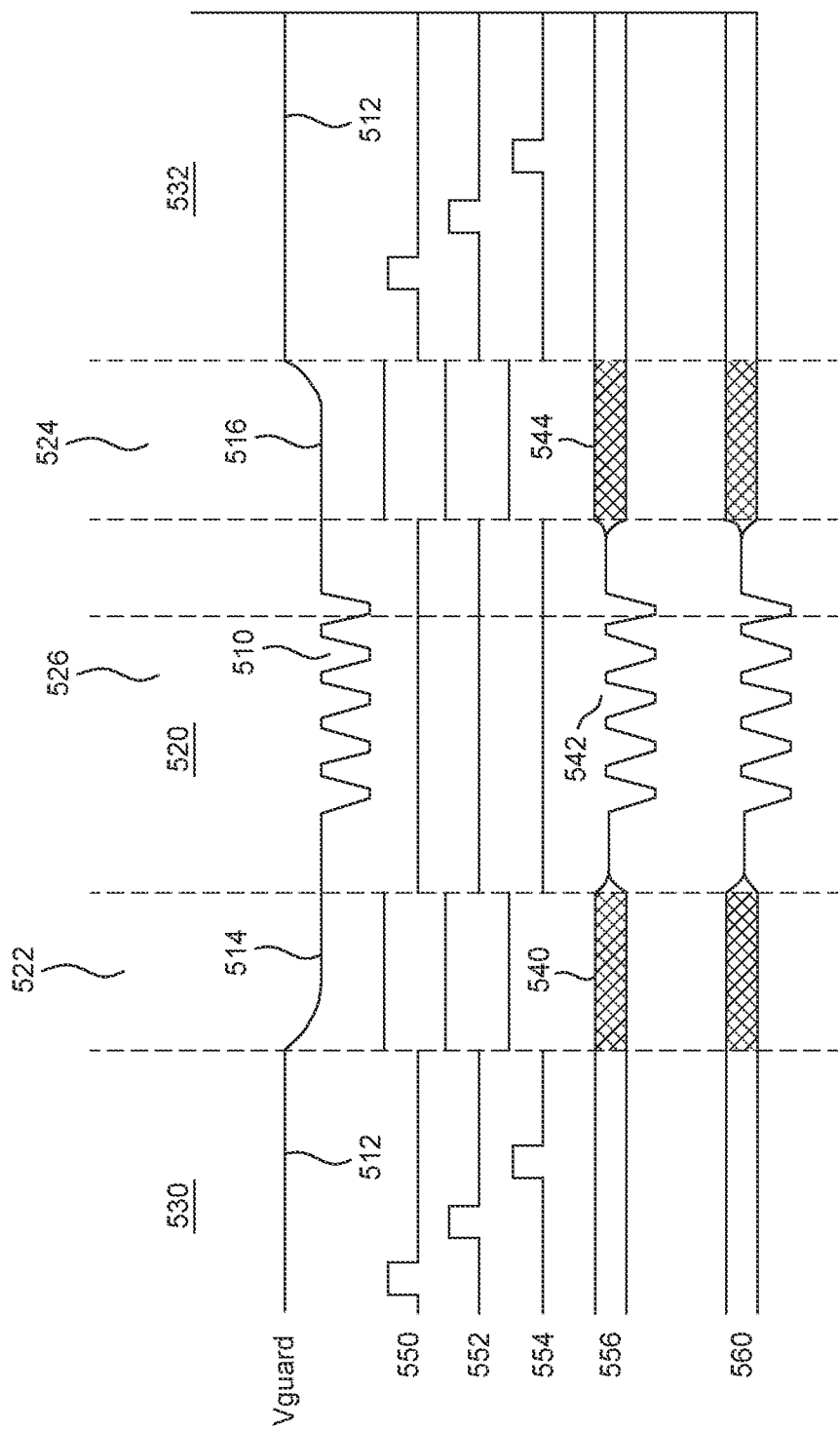

INPUT DEVICE HAVING REDUCED ELECTROMAGNETIC INTERFERENCE

CROSS-REFERENCE TO RELATED APPLICATIONS

This application is a continuation of U.S. patent application Ser. No. 16/533,477 titled "INPUT DEVICE HAVING REDUCED ELECTROMAGNETIC INTERFERENCE," filed Aug. 6, 2019, the entire contents of which is incorporated herein by reference.

BACKGROUND

The disclosure herein is generally related to electronic devices, and more specifically, to capacitive sensing devices.

DESCRIPTION OF THE RELATED ART

Input devices including proximity sensor devices may be used in a variety of electronic systems. A proximity sensor device may include a sensing region, demarked by a surface, in which the proximity sensor device determines the presence, location, force and/or motion of one or more input objects. Proximity sensor devices may be used to provide interfaces for the electronic system. For example, proximity sensor devices may be used as input devices for larger computing systems, such as touchpads integrated in, or peripheral to, notebook or desktop computers. Proximity sensor devices may also often be used in smaller computing systems, such as touch screens integrated in cellular phones.

SUMMARY

In one embodiment, a processing system for an input device comprises a driver module and a source driver. The driver module is configured to drive a sensor electrode with a sensing signal during a first portion of a non-display update period of a display frame. The sensing signal comprises a varying voltage. The source driver is configured to drive a first data line of a display panel with a first constant voltage during at least one of a second portion of the non-display update period and a third portion of the non-display update period. The source driver is further configured to output a guard signal during the first portion of the non-display update period. The first portion of the non-display update period occurs after the second portion of the non-display update period and before the third portion of the non-display update period. Further, the guard signal comprises a varying voltage having at least one of a frequency, phase and amplitude in common with the sensing signal.

In one embodiment, an input device comprises a plurality of data lines of a display panel, a plurality of sensor electrodes, and a processing system. The processing system is configured to drive a sensor electrode of the plurality of sensor electrodes with a sensing signal during a first portion of a non-display update period of a display frame. The sensing signal comprises a varying voltage. The processing system is further configured to drive a first data line of the plurality of data lines with a first constant voltage during at least one of a second portion of the non-display update period and a third portion of the non-display update period. Further, the processing system is configured to output a guard signal during the first portion of the non-display update period. The first portion of the non-display update period occurs after the second portion of the non-display update period and before the third portion of the non-display update period. Further, the guard signal comprises a varying voltage having at least one of a frequency, phase and amplitude in common with the sensing signal.

In one embodiment, a method for input sensing comprises driving a sensor electrode with a sensing signal during a first portion of a non-display update period of a display frame. The sensing signal comprises a varying voltage. The method further comprises driving a first data line of a display panel with a first constant voltage during at least one of a second portion of the non-display update period and a third portion of the non-display update period. Further, the method comprises outputting a guard signal during the first portion of the non-display update period. The first portion of the non-display update period occurs after the second portion of the non-display update period and before the third portion of the non-display update period. Further, the guard signal comprises a varying voltage having at least one of a frequency, phase and amplitude in common with the sensing signal.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

FIG. 5 illustrates waveforms utilized in operating an input device, according to one or more embodiments.

Figure 1:
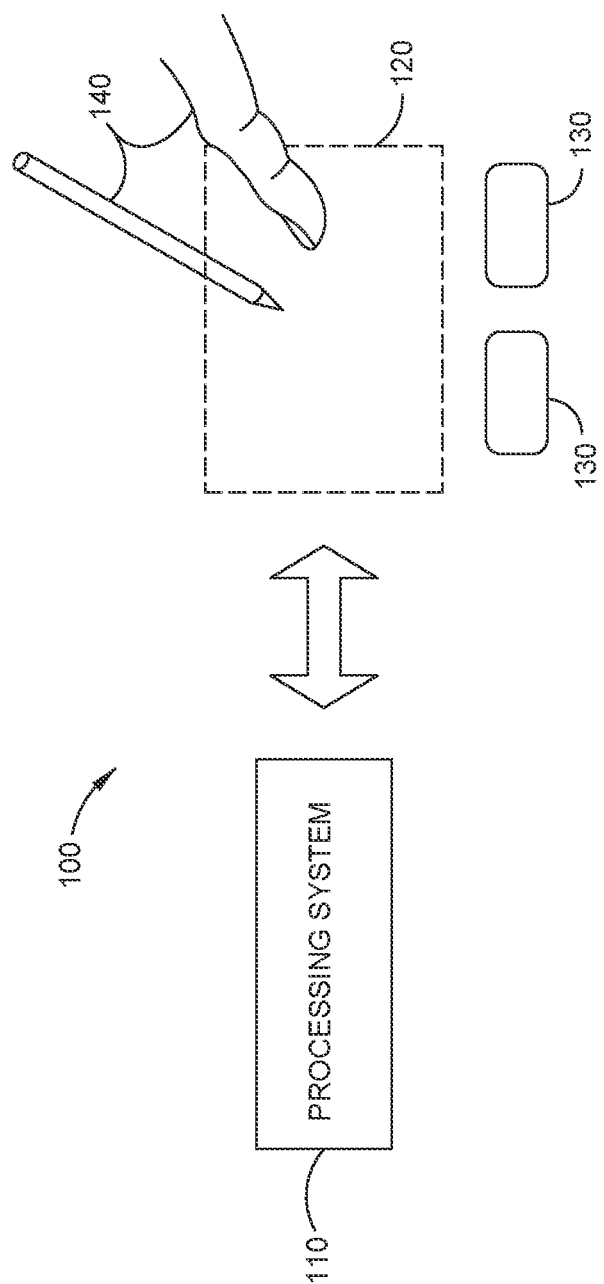
FIG. 1 illustrates an example input device, according to one or more embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

In one or more embodiments, the slew rate of a voltage transition driven on a sensor electrode may be controlled by driving one or more data lines with a constant voltage. For example, the slew rate of the voltage transition driven on a sensor electrode when transitioning from display updating to input sensing, may be reduced, reducing electromagnetic interference (EMI) generated by the corresponding device.

An example input device 100 as shown in FIG. 1 in accordance with embodiments of the disclosure may be configured to provide input to an electronic system (not shown). As used in this document, the term "electronic system" broadly refers to any system capable of electronically processing information. Some non-limiting examples of electronic systems include personal computers of all sizes and shapes, such as desktop computers, laptop computers, netbook computers, tablets, web browsers, e-book readers, personal digital assistants (PDAs) and multi-media entertainment devices of automobiles. Additional example electronic systems include composite input devices, such as physical keyboards that include input device 100 and separate joysticks or key switches. Further example electronic systems include peripherals such as data input devices, e.g., remote controllers and mice, and data output devices, e.g., display screens and printers. Other examples include remote terminals, kiosks, and video game machines, e.g., video game consoles, portable gaming devices, and the like. Other examples include communication devices, e.g., cellular phones such as smart phones, and media devices, e.g., recorders, editors, and players such as televisions, set-top boxes, music players, digital photo frames, and digital cameras. Additionally, the electronic system could be a host or a slave to the input device. The electronic system may also be referred to as electronic device.

The input device 100 can be implemented as a physical part of the electronic system, or can be physically separate from the electronic system. In one embodiment, the electronic system may be referred to as a host device. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device configured to sense input provided by one or more input objects 140 in a sensing region 120. Example input objects 140 include fingers and styli, as shown in FIG. 1. An exemplary proximity sensor device may be a touch-pad, a touch screen, a touch sensor device and the like.

The sensing region 120 encompasses any space above, around, in and/or near the input device 100 in which the input device 100 is able to detect user input, e.g., user input provided by one or more input objects 140. The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiment's sense input that comprises: no contact with any surfaces of the input device 100; contact with an input surface, e.g. a touch surface, of the input device 100: contact with an input surface of the input device 100 coupled with some amount of applied force or pressure; and/or a combination thereof. In various embodiments, input surfaces may be provided by surfaces of casings within which the sensor electrodes (also referred to herein as sensing electrodes) reside, by face sheets applied over the sensor electrodes or any casings, etc. In some embodiments, the sensing region 120 has a rectangular shape when projected onto an input surface of the input device 100. An input object that is not in contact with any surfaces of the input device 100 may be referred to as a hovering input object.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images (e.g. of capacitive signals) that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self-capacitance" (also often referred to as "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage, e.g. system ground, and by detecting the capacitive coupling between the sensor electrodes and input objects. In some implementations sensing elements may be formed of a substantially transparent metal mesh (e.g. a reflective or absorbing metallic film patterned to minimize visible transmission loss from the display sub-pixels). Further, the sensor electrodes may be disposed over a display of a display device. The sensing electrodes may be formed on a common substrate of a display device (e.g. on the encapsulation layer of a rigid or flexible organic light emitting diode (OLED) display). An additional dielectric layer with vias for a jumper layer may also be formed of a substantially transparent metal mesh material (e.g. between the user input and an OLED cathode). The jumpers of the jumper layer may be coupled to the electrodes of a first group and cross over sensor electrodes of a second group.

Some capacitive implementations utilize "mutual capacitance" (also often referred to as "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also referred to herein as "transmitter electrodes" or "transmitters") and one or more receiver sensor electrodes (also referred to herein as "receiver electrodes" or "receivers"). The coupling may be reduced when an input object coupled to a system ground approaches the sensor electrodes. Transmitter sensor electrodes may be modulated relative to a reference voltage, e.g., system ground, to transmit transcapacitive sensing signals. Receiver sensor electrodes may be held substantially constant relative to the reference voltage or modulated relative to the transmitter sensor electrodes to facilitate receipt of resulting signals. A resulting signal may comprise effect(s) corresponding to one or more transcapacitive sensing signals, and/or to one or more sources of environmental interference, e.g. other electromagnetic signals. Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) chips and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. The processing system 110 may be an application specific integration circuit (ASIC). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (in another embodiment, with associated firmware) separate from the central processing unit. As another example, the input device 100 may be physically integrated in a phone, and the processing system 110 may comprise circuits and firmware that are part of a main processor (e.g. a mobile device application processor or any other central processing unit) of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. The modules may operate hardware such as sensor electrodes and display screens. Further, the modules may process data such as sensor signals and positional information, and report information.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system, e.g., to a central processing system of the electronic system that is separate from the processing system 110, if such a separate central processing system exists. In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. The filtering may comprise one or more of demodulating, sampling, weighting, and accumulating of analog or digitally converted signals (e.g. for FIR digital or IIR switched capacitor filtering) at appropriate sensing times. The sensing times may be relative to the display output periods (e.g., display line update periods or blanking periods). As yet another example, the processing system 110 may subtract or otherwise account for a baseline, such that the information reflects a difference between the electrical signals from user input and the baseline signals. A baseline may account for display update signals (e.g. subpixel data signal, gate select and deselect signal, or emission control signal) which are spatially filtered (e.g. demodulated and accumulated) and removed from the lower spatial frequency sensing baseline. Further, a baseline may compensate for a capacitive coupling between the sensor electrodes and one or more nearby electrodes. The nearby electrodes may be display electrodes, dummy sensor electrodes, and or other conductive objects that may be capacitively coupled with the sensor electrodes. Additionally, the baseline may be compensated for using digital or analog means. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of a display screen. For example, the sensing region 120 may overlap at least a portion of an active area of a display screen (or display panel). The active area of the display panel may correspond to a portion of the display panel where images are updated. In one or more embodiments, the input device 100 may comprise substantially transparent sensor electrodes overlaying the display screen and provide a touch screen interface for the associated electronic system. The display panel may be any type of dynamic display capable of displaying a visual interface to a user, and may include any type of light emitting diode (LED), OLED, cathode ray tube (CRT), liquid crystal display (LCD), plasma, electroluminescence (EL), or other display technology. The input device 100 and the display panel may share physical elements. For example, some embodiments may utilize some of the same electrical components for displaying and sensing. As another example, the display panel may be operated in part or in total by the processing system 110.

It should be understood that while many embodiments of the disclosure are described in the context of a fully functioning apparatus, the mechanisms of the present disclosure are capable of being distributed as a program product, e.g., software, in a variety of forms. For example, the mechanisms of the present disclosure may be implemented and distributed as a software program on information bearing media that are readable by electronic processors, e.g., non-transitory computer-readable and/or recordable/writable information bearing media readable by the processing system 110. Additionally, the embodiments of the present disclosure apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
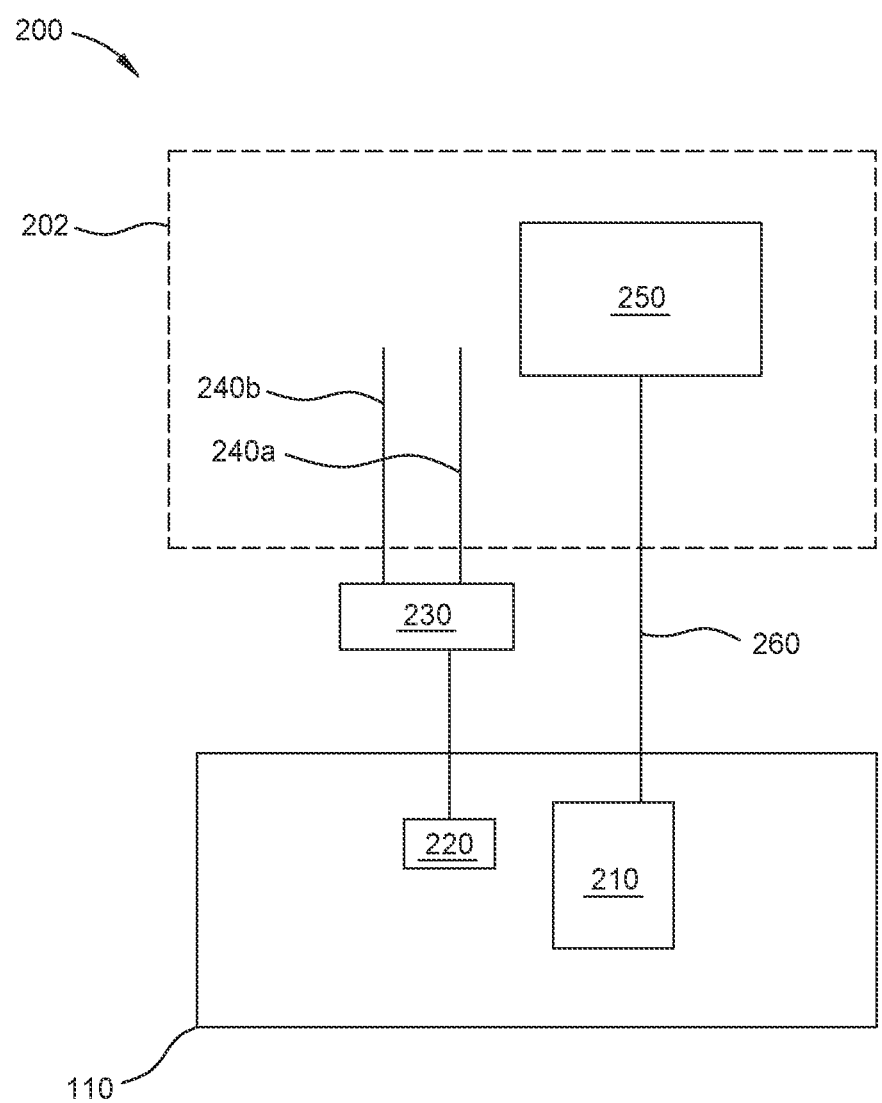
FIGS. 2 and 3 illustrate example input devices, according to one or more embodiments.

FIG. 2 illustrates an input device 200, according to one or more embodiments. The input device 200 may be configured similar to that of input device 100. In the illustrated embodiment, the input device 200 includes a display panel 202, a processing system 110, and a selection mechanism 230. In one or more embodiments, the input device 200 may be function as an input device for a multimedia system of an automobile. For example, the input device 200 may be part of an infotainment system of an automobile. In other embodiments, the input device 200 is an input device for other types of electronic systems as is described above with regard to FIG. 1.

The display panel 202 includes data lines 240 and a sensor electrode 250. The display panel 202, including the data lines 240 and the sensor electrode 250, is described in greater detail with regard to FIG. 3. In one embodiment, an image displayed by the display panel 202 is updated during a display frame. As will be described in greater detail with regard to FIG. 3, updating of the display panel 202 may include driving the data lines 240 and the sensor electrode 250 with display update signals during the display frame. In one embodiment, a display frame may be updated once every 16 ms or at a display frame rate of 60 Hz. In other embodiments, other display frame rates may be utilized. For example, display frame rates of 48 Hz, 120 Hz, 180 Hz, 220 Hz, and 240 Hz, among others, may be utilized.

In one embodiment, each display frame may include one or more display update periods (e.g., display term) and one or more non-display update periods (e.g., touch term or non-display term). During the display update periods one or more elements (e.g., the data lines 240, the sensor electrode 250) are driven with display update signals to update the display panel 202. Further, during each non-display update period capacitive sensing may occur and updating of the display panel 202 may be suspended. In various embodiments, the display update periods and non-display update periods are non-overlapping. For example, the non-display update periods may occur between display update periods of a display frame. Further, each of the display update periods corresponds to a display line update period, during which a display line of the display panel 202 is updated. The display lines are described in greater detail with regard to FIG. 3. In various embodiments, each non-display update period may be at least as long in time as a display line update period. In such an embodiment, the non-display update period may be referred to as a long horizontal blanking period, long h-blanking period or a distributed blanking period. Further, each non-display update period may be longer than two or more display line update periods. In other embodiments, the non-display update period may comprise a combination of horizontal blanking periods and vertical blanking periods of a display frame.

In one embodiment, the sensor electrode 250 comprises one or more display electrodes used in updating the display panel 202. In one or more embodiment, the display electrodes comprise one or more segments of a Vcom electrode (common electrodes), a data line, gate line, an anode electrode, a cathode electrode, or any other display element. In one embodiment, the common electrodes may be disposed on the transparent substrate (a glass substrate, TFT glass, or any other transparent material), or on the bottom of the color filter glass. In one or more embodiments, the common electrode or electrodes may be utilized for both capacitive sensing and display updating. As will be described with greater detail with regard to FIG. 3, in various embodiments, the common electrode may be segmented to form a plurality of common electrodes and the sensor electrodes 250 may comprise one or more common electrode.

The processing system 110 includes a driver module 210 and a source driver 220. The driver module 210 may be coupled to the sensor electrode 250 via a trace 260. In one embodiment, the driver module 210 drives the sensor electrode 250 with a sensing signal to acquire sensor data. For example, the driver module 210 may drive the sensor electrode 250 with the sensing signal during a first portion of a first non-display update period (e.g., portion 526 of the non-display update period 520) of a display frame. Driving the sensor electrode 250 with a sensing signal may correspond to absolute capacitive sensing and/or transcapacitive sensing which are described in greater detail in the following with regard to FIG. 3. FIG. 5 illustrates an example sensing signal 510. In one or more embodiments, as the processing system 110 is configured for capacitive sensing and display updating, the processing system 110 may be referred to as a touch and display driver integration (TDDI) device.

In one embodiment, the sensing signal is a varying voltage signal. Further, the sensing signal has a frequency, amplitude and phase. For example, the sensing signal may have a frequency in a range of about 100 KHz to about 2 MHz. However, in other embodiments, other frequencies may be utilized. Further, the sensing signal may have a peak-to-peak amplitude in a range of about 1 V to about 10 V. However, in other embodiments, other amplitudes may be utilized. In one embodiment, a center voltage of the sensing signal may be in a range of about −3 V to about 0 V. Alternatively, the center voltage of the sensing signal may be in a range of about 0 V to about 3 V. However, in other embodiments, other center voltages may be used. In one or more embodiments, the sensing signal may be referred to as a stimulus signal (Vstim or Vguard).

The driver module 210 may be further configured to drive the sensor electrode 250 for display updating during a display update period of a display frame. For example, the driver module 210 may drive the sensor electrode 250 with a common voltage during the display update period of the display frame. The common voltage may be constant voltage. For example, the common voltage may be a direct current (DC) voltage. In one or more embodiments, the common voltage may be in a range of about −2 V to about 2 V. However, in other embodiment, other voltages may be used. Further, as will be described in greater detail with regard to FIG. 3, the sensor electrode 250 functions as a common electrode for display updating when driven with the constant voltage during the display update period.

In one embodiment, the driver module 210 drives the sensor electrode 250 with a first constant voltage before the driver module 210 drives the sensor electrode 250 with the sensing signal. For example, the driver module 210 transitions the sensor electrode 250 from the common voltage to the first constant voltage before driving the sensor electrode 250 with the sensing signal. The first constant voltage may be a DC voltage. In one embodiment, the driver module 210 transitions the sensor electrode 250 from the common voltage to the first constant voltage during a second portion of the first non-display update period (e.g., the portion 522 of the non-display update period 520 of FIG. 5). The second portion of the non-display update period occurs before the first portion of the first non-display update period. Further, the driver module 210 transitions the sensor electrode 250 from a second constant voltage to the common voltage during a third period of the first non-display update period and after driving the sensor electrode 250 with the sensing signal. The third portion of the first non-display update period (e.g., the portion 524 of the non-display update period 520 of FIG. 5) occurs after the first portion of the first non-display update period. Further, the second constant voltage may be DC voltage. Further, the second constant voltage may be equal to, greater than or less than the first constant voltage.

The source driver 220 is coupled to the data lines 240a, 240b. In one embodiment, the source driver 220 is coupled to the data lines 240a, 240b via the selection mechanism 230. In other embodiments, the selection mechanism 230 may be omitted, and the source driver 220 may be directly coupled with the data line 240a or the data line 240b. The source driver 220 may drive the data lines 240 with subpixel data signals to update the display panel 202.

Further, the source driver 220 may be configured to output a guard signal during at least the first portion of the first non-display update period and while the sensor electrode 250 is driven with the sensing signal. The guard signal may have a varying voltage. Further, the guard signal may have at least one of a frequency, amplitude and phase in common with the sensing signal. In one or more embodiments, the frequency, amplitude and phase of the guard signal is the same as the frequency, amplitude and phase of the sensing signal. An example guard signal, e.g., the guard signal 542, is illustrated in FIG. 5. Outputting the guard signal mitigates the capacitive coupling between the source driver 220 and the sensor electrode 250 and the trace 260. In an embodiment where the data lines 240 are coupled to the source driver 220, the source driver 220 drives the data lines 240 with the guard signal. Accordingly, the capacitance between the data line 240 and the sensor electrode 250 and/or the trace 260 is mitigated.

The source driver 220 outputs a third constant voltage during the second portion and the third portion of the first non-display update period. The third constant voltage may be a DC voltage. Further, the third constant voltage may be the same as or different from (e.g., greater than or less than) the first constant voltage and/or the second constant voltage. In one embodiment, the source driver 220 drives one or more of the data lines 240a, 240b with the third constant voltage during the second portion and the third portion of the first non-display update period. In one embodiment, the source driver 220 drives one or more of the data lines 240a, 240b with the third constant voltage during the second portion and the third portion of the first non-display update period.

The selection mechanism 230 may be a multiplexer. In other embodiments, the selection mechanism 230 may be another type of switching device. In one embodiment, during the first portion of a first display update period the selection mechanism 230 couples the data line 240a with the source driver 220. Further, during the second portion of the first display update period the selection mechanism 230 couples the data line 240b with the source driver 220. In one embodiment, the selection mechanism 230 may be configured to couple one or more of the data line 240a and the data line 240b with the source driver 220 during a non-display update period. For example, during the second portion of the first non-display update period the selection mechanism 230 couples the data lines 240a, 240b with the source driver 220. Further, during the third portion of the first non-display update period the selection mechanism 230 may couple the data lines 240a, 240b with the source driver 220. Further, during the first portion of the non-display update period, the switching mechanism couples the data lines 240a, 240b with the source driver 220 or decouples the data lines 240a, 240b from the source driver 220.

Figure 3:
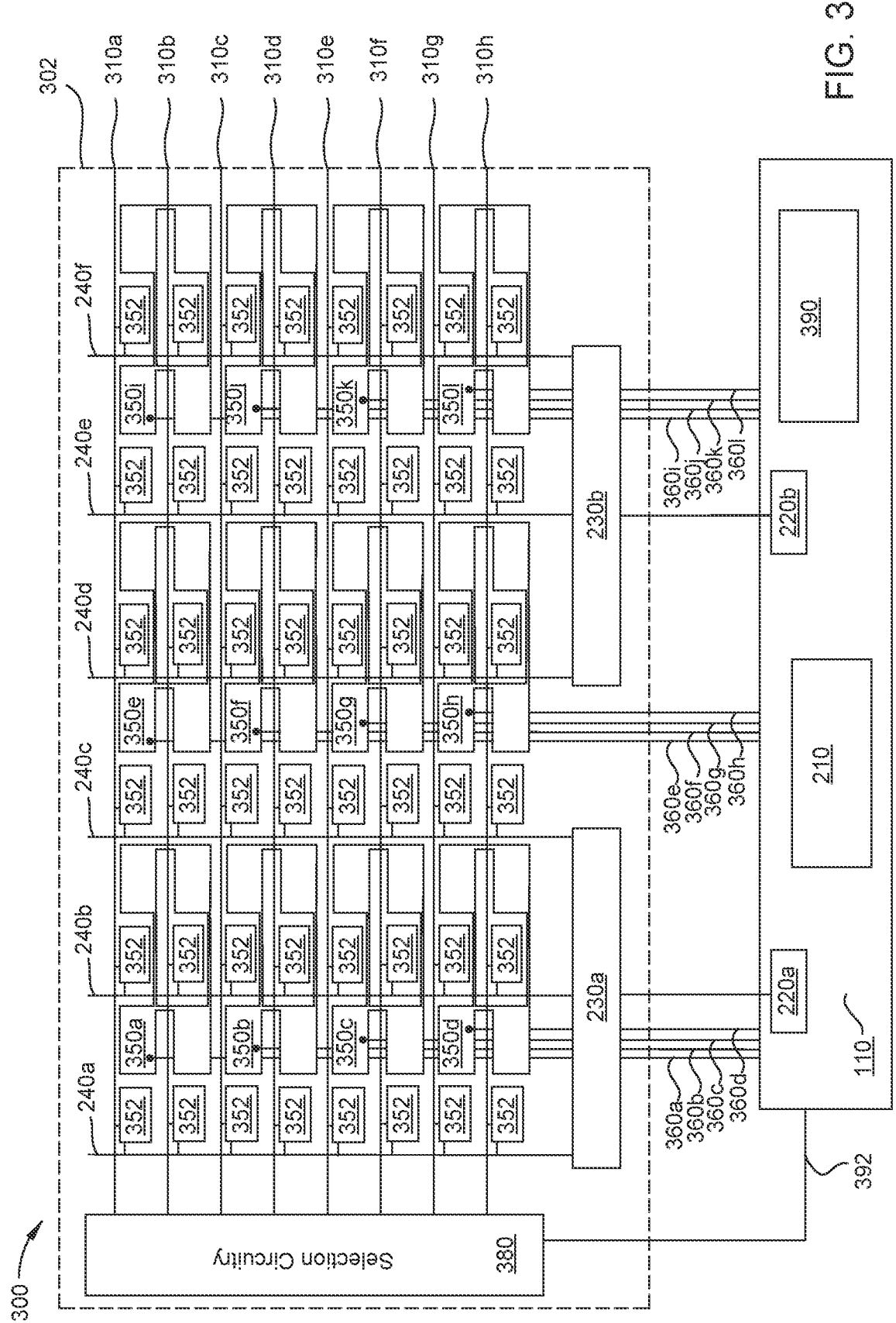

FIG. 3 illustrates an input device 300, according to one or more embodiments. As illustrated, the input device 300 includes a display panel 302, and the processing system 110.

The display panel 302 includes the data lines 240, gate lines 310, subpixels 352, sensor electrodes 350 and traces 360. The display panel 302 may additionally include the gate selection circuitry 380. In one embodiment, updating the display panel 302 includes updating the voltages driven on each of the subpixels 352.

Each of the subpixels 352 may include a subpixel electrode and subpixel circuitry. The subpixel circuitry couples the subpixel electrode to a respective one of the gate lines 310 and a respective one of the data lines 240. The subpixel circuitry may include one or more transistors and one or more capacitors configured to control the activation and deactivation of each subpixel and the voltage driven on each subpixel 352. For example, the subpixel circuitry may couple the subpixel 352 electrode of a subpixel 352 with a data signal driven on a corresponding one of the data lines 240.

The subpixels 352 may be grouped to form pixels. For example, the subpixels 352 may include subpixels of a first type, subpixels of a second type and subpixels of a third type. Further each pixel may include a subpixel of a first type, a subpixel of a second type and a subpixel of a third type. In other embodiments, the subpixels may include subpixels of a fourth type or more, and each pixel may include a subpixel of each type. In various embodiments, each pixel may include more than one subpixel of at least one type. For example, each pixel may include two subpixels of the second type. In one embodiment, the different types of subpixels 352 correspond to different colors. For example, subpixels of a first type may be red subpixels, subpixels of a second type may be green subpixels and subpixels of a third type may be blue subpixels. In other embodiments, other colors may be used. For example, subpixels of a fourth type may correspond to white.

The subpixels 352 may be arranged in a plurality of rows and columns. Each row of subpixels 352 may correspond to a display line. Alternatively, a display line may correspond to a group of subpixels 352 that are updated during a common period. Further, the period of time corresponding to when each subpixel 352 of a display line is updated may be referred to a display line update period.

The gate lines 310 are coupled to one or more subpixels 352. The gate lines 310 may be driven with gate select signals to select the subpixels 352 for updating. For example, a gate line 310a may be driven with a gate select signal to select the subpixels 352 coupled to the gate line 310a for updating. In various embodiments, each gate line 310 is coupled to a respective row of the subpixels 352. In one or more embodiments, at least two gate lines 310 are coupled to the subpixels 352 of a common row. In various embodiments, the gate lines 310 are disposed within one or more metals layers of the substrate (not shown) of the display panel 202.

The gate selection circuitry 380 may be configured to drive a gate select signal on the gate lines 310 to select (active) and deselect (deactivate) the subpixels 352 for updating. The gate select signal may include a voltage transition between a gate high signal, or $V_{GH}$, and a gate low signal, or $V_{GL}$. In one or more embodiments, $V_{GH}$ and $V_{GL}$ correspond to the turn-on and turn-off voltages of the select transistors of the subpixel circuitry of the subpixels 352. The select transistors are configured to control activation and deactivation of the subpixels 352. In one embodiment, when the gate select signal transitions from $V_{GL}$ to $V_{GH}$, the subpixels 352 coupled to the driven gate electrode may be selected for updating. Further, when the gate select signal transitions from $V_{GH}$ to $V_{GL}$, the subpixels 352 coupled to the driven gate electrode may be deselected for updating. Alternatively, in various embodiments, $V_{GH}$ may correspond to a turn-off voltage of the select transistors and $V_{GL}$ may correspond to a turn-on voltage of the select transistors. In such embodiments, the gate select signal may transition from $V_{GH}$ to $V_{GL}$ to select a gate electrode for updating and from $V_{GL}$ to $V_{GH}$ to deselect the gate electrode for updating. In one embodiment, $V_{GH}$ is a positive voltage and $V_{GL}$ is a negative voltage. For example, $V_{GH}$ may be about 15 V and $V_{GL}$ may be about −10 V. However, in other embodiments, other voltages may be used.

The data lines 240 may be coupled to a column of subpixels 352. Further, the data lines may communicate subpixel data signals onto the subpixels 352 to update the subpixels 352. The subpixel data signals may be voltage signals. Further, the value of each subpixel data signal may correspond to a brightness level for each corresponding subpixel 352. The data lines 240 may be disposed within one or more metals layers of the substrate (not shown) of the display panel 202.

The sensor electrodes 350 may be formed from segments of a segmented common electrode. The sensor electrodes 350 may be configured for capacitive sensing and display updating (e.g., updating the display panel 302). In one embodiment, the sensor electrodes 350 may function as a common voltage reference for the subpixels 352 during display updating. For example, one or more of the sensor electrodes 350 may be driven with a common voltage for display updating. Further, the sensor electrodes 350 may be driven with sensing signals for capacitive sensing.

In one or more embodiments, each sensor electrode 350 may be associated with a portion of two or more rows of subpixels and/or a portion of two or more columns of subpixels. Further, the sensor electrodes 350 and the subpixel electrodes of subpixels 352 may be disposed such that they are horizontally separated from each other. In other embodiments, the sensor electrodes 350 are arranged such that they overlap two or more rows of subpixels 352 and multiple columns of subpixels 352. In such embodiments, the sensor electrodes 350 may be vertically separated from the subpixel electrodes of the subpixels 352.

In one or more embodiments, the number of sensor electrodes 350 may vary from the embodiment of FIG. 3. For example, while the embodiment of FIG. 3 illustrates 12 sensor electrodes, in other embodiments, more than or less than 12 sensor electrodes may be utilized. For example, in one or more embodiments, the display panel 202 may have hundreds of sensor electrodes 350. In embodiments where the input device 300 includes the sensor electrodes 350 disposed in a common layer, the input device 300 may be referred to as including Advanced Matric Pad (AMP) technology.

The selection mechanisms 230 couple the data lines 240 with source drivers 220 of the processing system 110. Each of the selection mechanisms 230 may be coupled to two or more data lines 240. In one embodiment, each selection mechanism 230 is coupled to a number of the data lines 240 that corresponds to the number of subpixels 352 that form each pixel. For example, in one embodiment, the pixels are formed from three subpixels 352 and each selection mechanism 230 is coupled to three data lines. In one embodiment, the data lines 240a, 240b and 240c are coupled to the selection mechanism 230a and the data lines 240d, 240e and 240f are coupled to the selection mechanism 230b. In other embodiments, the data lines 240 may be coupled to the selection mechanisms 230 via different groupings. For example, in one embodiment, data lines 240a and 240b may be coupled to the selection mechanism 230a and data lines 240c and 240d may be coupled to the selection mechanism 230b. In other embodiments, data lines 240a, 240b, 240c and 240d may be coupled to the selection mechanism 230a and data lines 240e, 240f and data lines not illustrated may be coupled to the selection mechanism 230b.

The selection mechanisms 230 may couple and decouple the data lines 240 from the source drivers 220 such that each subpixel 352 is updated with a corresponding subpixel data signal during a corresponding display line update period. For example, the selection mechanism 230a may couple data line 240a with the source driver 220a and decouple the data line 240b and 240c from the source driver 220a to update the subpixels 352 coupled to the data line 240a during a first display line update period. Further, the selection mechanism 230a may couple data line 240b with the source driver 220a and decouple the data line 240a and 240c from the source driver 220a to update the subpixels 352 coupled to the data line 240b during a second display line update period. Additionally, the selection mechanism 230a may couple data line 240c with the source driver 220a and decouple the data line 240a and 240b from the source driver 220a to update the subpixels 352 coupled to the data line 240c during a third display line update period. In one embodiment, the selection mechanisms 230 may simultaneously couple each associated data line 240 with a corresponding source driver 220. In another embodiment, the selection mechanisms 230 may simultaneously decouple each associated data line 240 from a corresponding the source driver 220a.

In various embodiments, the selection mechanisms 230 may be omitted and the data lines 240 may be directly coupled with the source drivers 220. For example, each data line 240 may be directly coupled with a respective source driver 220.

The source drivers 220 may drive the data lines 240 with subpixel data signals to update selected subpixels 352 during corresponding display line update periods. For example, driving the subpixels 352 with the subpixel data signals drives the subpixel electrodes of the subpixels 352 to a voltage level. The difference between the voltage level of the subpixel electrodes of the subpixels 352 and the voltage of the sensor electrodes 350 may determine the brightness of each subpixel 352 and the color and/or brightness of each pixel.

In one or more embodiments, the processing system 110 is coupled to each sensor electrode 350 via a corresponding trace 360. The traces 360 may be disposed within one or more layers of a substrate (not shown) of the display panel 302. In one embodiment, one or more multiplexers may be coupled between the traces 360 and the processing system 110 such that two or more traces and electrodes are coupled to each multiplexer. The driver module 210 may drive each sensor electrode 350 for capacitive sensing and display updating. In one embodiment, driving a sensor electrode 350 for display updating includes driving the sensor electrode with a common voltage (e.g., a reference voltage). The common voltage may be a constant voltage (e.g., a DC voltage). In one embodiment, during a display update period (e.g., the display update period 530 or 532 of FIG. 5), two or more of the sensor electrodes 350 are driven with the common voltage. Further, driving the sensor electrodes 350 for capacitive sensing may include driving the sensor electrodes with one or more of a sensing signal and a guard signal. In one embodiment, the driver module 210 drives the sensor electrodes 350 for capacitive sensing during at least a portion of a non-display update period (e.g., the portion 526 of the non-display update period 520 of FIG. 5).

In one embodiment, the driver module 210 comprises circuitry configured for capacitive sensing. For example, the driver module 210 may include one or more transmitters configured to drive sensing signals and receivers configured to receive resulting signals. The transmitters may include one or more amplifiers and/or other circuit elements. The receivers may include one or more analog front ends (AFEs), filters, analog-to-digital converters (ADCs), and demodulators, among others.

In one embodiment, the driver module 210 is configured to operate the sensor electrodes 350 for transcapacitive sensing. In such an embodiment, the driver module 210 drives a transmitter signal onto a first one or more of sensor electrodes 350 and receive resulting signals from a second one or more of sensor electrodes 350 or other sensor electrodes (not illustrated). The transmitter signal may be the sensing signal as is described above. In various embodiments, the driver module 210 is configured to operate the sensor electrodes 350 for absolute capacitive sensing. In such embodiments, the driver module 210 is configured to drive an absolute capacitive sensing signal onto the sensor electrodes 350 and receive resulting signals with the sensor electrodes 350 for absolute capacitive sensing. In one embodiment, the absolute capacitive sensing signal is the sensing signal as is described above.

In one or more embodiments, transcapacitive sensing methods are based on changes in the capacitive coupling between sensor electrodes. For example, transcapacitive sensing methods may be based on changes in capacitive couple between sensor electrodes 350, or between sensor electrodes 350 and other sensor electrodes not illustrated. In various embodiments, an input object (e.g., the input object 140) near the sensor electrodes 350 alters the electric field between the sensor electrodes, thus changing the measured capacitive coupling. In one embodiment, a transcapacitive sensing method operates by detecting the capacitive coupling between two or more sensor electrodes 350.

In one embodiment, absolute capacitance (or self-capacitance) sensing methods are based on changes in the capacitive coupling between driven (or modulated) sensor electrodes 350 and an input object (e.g., the input object 140). In various embodiments, an input object near the sensor electrodes 350 alters the electric field near the driven sensor electrodes, thus changing the measured absolute capacitive coupling of the driven sensor electrodes.

In one or more embodiments, the processing system 110 may additionally include a determination module 390. The determination module 390 may be configured to determine positional information for an input object (e.g., the input object 14) from resulting signals received by the driver module 210. In one or more embodiments, the determination module 390 receives the resulting signals from the driver module 210 and determines a measurement of a change in capacitive coupling between two or more sensor electrodes 350 or between one or more sensor electrodes 350 and an input object (e.g., the input object 140). Further, the determination module 390 may determine positional information for one or more input objects 140 based on the measurements of change in capacitive coupling. In one embodiment, the determination module 390 removes a baseline from the resulting signals, determines changes in capacitive coupling based on the baseline resulting signals, and determines positional information from the determined changes in capacitive coupling. Further, in one or more embodiments, the determination module 390 determines a capacitive image from the changes in capacitive coupling and determines the positional information for an input object (e.g., the input object 140) from the capacitive image.

In one embodiment, the areas of localized capacitive sensing of capacitive couplings may be termed "capacitive pixels." The capacitive pixels may be formed between individual sensor electrodes of the sensor electrodes 350 and a reference voltage in embodiments employing absolute capacitive sensing methods and between groups of sensor electrodes 350 used as transmitter and receiver electrodes in embodiments employing transcapacitive sensing methods. For example, in an embodiment employing absolute capacitive sensing, the capacitive pixels may be formed between where parallel fields from the input object 140 couple to system ground of the input device 300. Further, in embodiments employing transcapacitive sensing method, the capacitive pixels may be formed where fringing fields of a first sensor electrode couple to a neighboring sensor electrode most strongly. In various embodiments, a set of measurements between the sensor electrodes 350 or between the sensor electrodes 350 and an input object may be utilized by the determination module 390 to form the capacitive pixels of a "capacitive image" or points along one or more capacitive profiles.

In one embodiment, the gate selection circuitry 380 may be disposed within a common integrated circuit (IC) chip with the processing system 110. In other embodiments, the gate selection circuitry 380 may be disposed within a first IC chip and the processing system 110 may be disposed within a second IC chip. Further, the selection mechanisms 230 may be disposed in a common IC chip with the processing system 110. In various embodiments, the selection mechanisms 230 may be disposed on a substrate of the display panel 302.

In one or more embodiments, the processing system 110 may include hardware and/or firmware elements configured to receive display data from a host device and process the display data to generate the subpixel data signals. For example, the processing system 110 may include a mobile industry processor interface (MIPI) receiver. Further, the processing system 110 may include timing control circuitry configured to generate timing signals used for display updating. In one embodiment, the processing system 110 is configured to receive display data from the host device for display updating. The driver module 210 may process the display data to generate subpixel update signals that are driven onto the data lines 240 to update the subpixels 352.

In one or more embodiments, the processing system 110 may be configured to communicate with the gate selection circuitry 380 via the selection circuitry control trace 392. In one embodiment, the processing system 110 communicates a control signal to the gate selection circuitry 380. The control signal may indicate which gate line 310 to select for display updating. In one embodiment, the control signal may indicate an order to select the gate lines 310 for updating. In one or more embodiments, the control signal is a clock signal, and the gate selection circuitry 380 selects the gate lines 310 for display updating based on rising edges and/or falling edges of the clock signal.

In one or more embodiments, the processing system 110 may be configured to communicate with the selection mechanisms 230. For example, the processing system 110 may communicate control signals to instruct the selection mechanisms 230 to couple or decouple one or more of the data lines 240 with corresponding source drivers 220.

Figure 4:
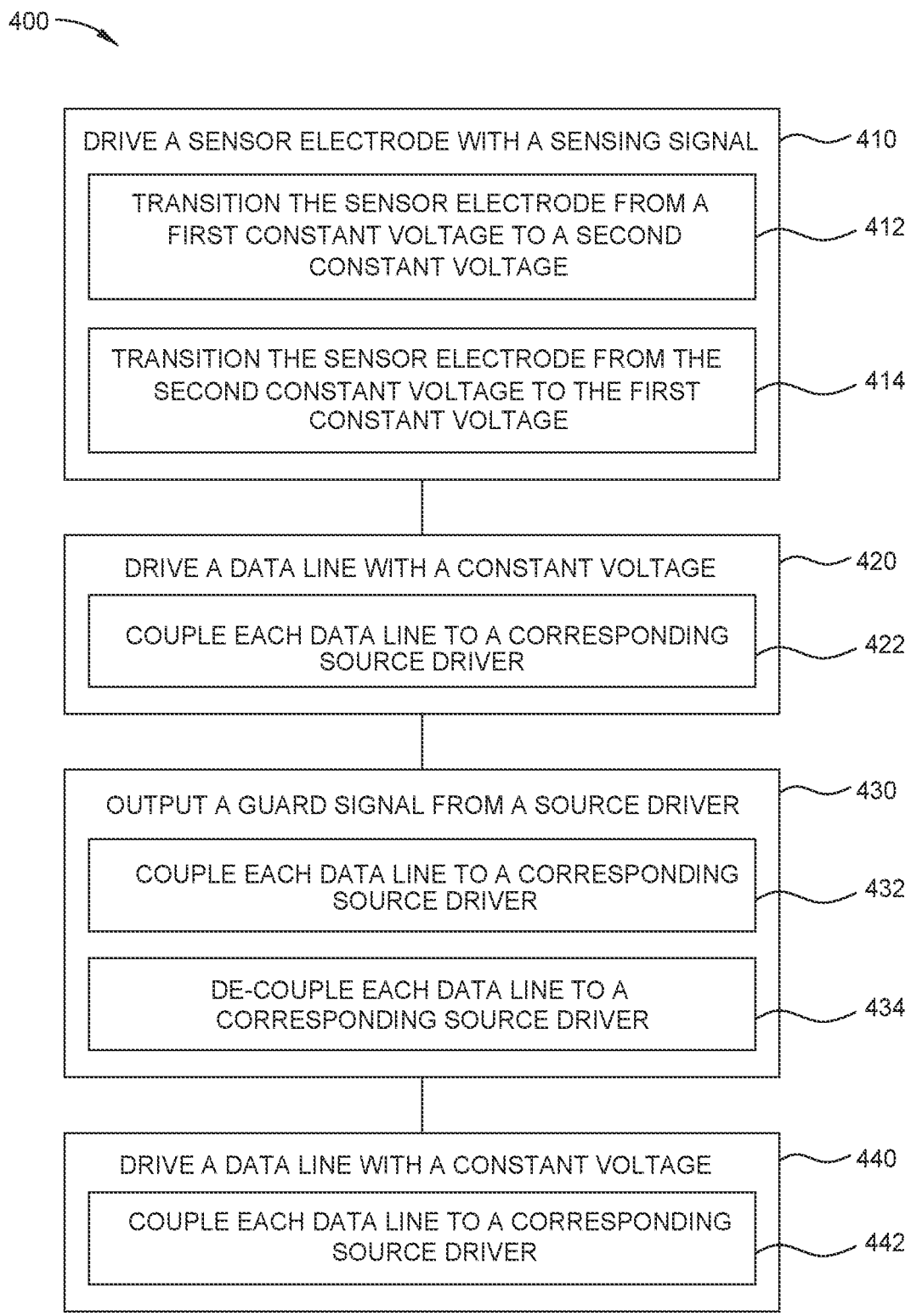
FIG. 4 is a flowchart for operating an input device, according to one or more embodiments.

FIG. 4 illustrates flowchart of method 400 for operating an input device (e.g., the input device 100, 200, or 300) according to one or more embodiments. In the following, the operations of method 400 will be described with regard to the timing diagram of FIG. 5. At operation 410, a sensor electrode is driven with a sensing signal. For example, in one embodiment, a first one of the sensor electrodes 350 is driven with a sensing signal by the driver module 210. An example sensing signal, the sensing signal 510, is illustrated in FIG. 5. The sensing signal 510 includes a varying voltage that has one or more voltage transitions. In one embodiment, the sensing signal 510 includes a varying voltage have a center voltage in a range of about −1 V to about −3 V. Further, the amplitude of the sensing signal 510 may be about 2 V peak to peak to about 5 V peak to peak. Alternatively, the sensing signal 510 may include a center voltage in a rage of about 1 V to about 3 V and has amplitude in a range of about 2 V peak to peak to about 5 V peak to peak. In other embodiments, other center voltages and/or other amplitudes may be utilized. In one embodiment, the driver module 210 drives sensor electrode 350a with the sensing signal 510 during at least a portion of the non-display update period 520.

In one embodiment, one or more of sensor electrodes 350 is driven with a common voltage 512 for display updating. For example, the driver module 210 drives the sensor electrode 350a with the common voltage 512 during the display update period 530. In various embodiments, before driving the sensor electrode 350a with a sensing signal, e.g., the sensing signal 510, the voltage of the sensor electrode 350a is transitioned from the common voltage 512 to the constant voltage 514 (e.g., operation 412). In one embodiment, the driver module 210 transitions the voltage of the sensor electrode 350a from the common voltage 512 to the constant voltage 514 during the portion 522 of the non-display update period 520. The constant voltage 514 may be less than or greater than the common voltage 512. Further, the constant voltage 514 may be a DC voltage. In one or more embodiments, the constant voltage 514 may be the center voltage of the sensing signal 510, the maximum voltage of the sensing signal 510, minimum voltage of the sensing signal 510, or any voltage between the maximum voltage and the minimum voltage of the sensing signal 510. As illustrated, the portion 522 of the non-display update period 520 occurs before the portion 526 of the non-display update period 520, and between the portion 526 of the non-display update period 520 and the display update period 530.

In one embodiment, the driver module 210 transitions the sensor electrode 350a from the constant voltage 516 to the common voltage 512 during the portion 524 of the non-display update period 520 (e.g., operation 414). The constant voltage 516 may be equal to the constant voltage 514. Alternatively, the constant voltage 516 may be greater than or less than the constant voltage 514. The sensor electrode 350a is then driven with the common voltage 512 during the display update period 532. The display update periods 530 and 532 may correspond to one or more display line update periods. In one embodiment, the display update periods 530, 532 and the non-display update period 520 are part of a common display frame. Further, the non-display update period 520 occurs between the display update periods 530, 532.

At operation 420, a constant voltage is driven onto a data line by a source driver. For example, the source driver 220a may output the constant voltage 540 during the portion 522 of the non-display update period 520. The constant voltage 540 may be a DC voltage. Further, the constant voltage 540 may be greater than, less than, or equal to the constant voltage 514. In one embodiment, the method 400 includes the operation 422, coupling each data line 240 to a corresponding source driver 220. For example, each selection mechanism 230a, 230b couples the associated data lines 240 with a corresponding one of source drivers 220a, 220b during the portion 522 of the non-display update period 520. In one embodiment, the control signals 550, 552, and 554 remain high during the portion 522 of the non-display update period 520 providing an indication to the selection mechanism 230a to couple the data lines 240a, 240b and 240c to the source driver 220a. In one embodiment, the number of control signals may correspond to the number of data lines 240 coupled to each selection mechanism 230. In one or more embodiments, the selection mechanisms 230 couple less than the total number of available data lines 240 to each source driver 220 during the portion 522 of the non-display update period 520.

In various embodiments, one or more of the source drivers 220 output the output signal 556. In one embodiment, the source drivers 220a, 220b drive the constant voltage 540 of the output signal 556 onto each of the corresponding data lines 240 during the portion 522 of the non-display update period 520. The corresponding signal that appears on the data lines 240 is shown as data line signal 560. For example, during the portion 522 of the non-display update period 520, the data line signal 560 is the same as the output signal 556 of a source driver, e.g., the source driver 220a or 220b.

In one embodiment, driving one or more of the data lines 240 with the constant voltage 540 alters the slew rate of the transition between the common voltage 512 and constant voltage 514 on the sensor electrode 350a. For example, as one or more of the data lines 240 are capacitively coupled to the sensor electrode 350a and/or the trace 360a, driving the data lines 240 with the constant voltage 540 alters the load capacitance experienced by the sensor electrode 350a and/or trace 360a. Accordingly, altering the load capacitance adjusts the slew rate of the transition between the common voltage 512 and the constant voltage 514. In one embodiment, adjusting the slew rate of the transition between the common voltage 512 and the constant voltage 514 reduces the electromagnetic interference (EMI) generated by the corresponding input device (e.g., the input device 100, 200, or 300). Further, reducing the load capacitance experienced by the sensor electrode 350a and/or trace 360a may increase the slew rate of the sensing signal (e.g., the sensing signal 510). In one embodiment, adjusting the slew rate of the transition between the common voltage 512 and the constant voltage 514 by driving the data lines 240 with the constant voltage 540 reduces the cost of the processing system 110 as dedicated slew rate control circuitry may be omitted from the processing system 110. Omitting dedicated slew rate control circuitry reduces the manufacturing cost of the processing system 110 and/or the input device (e.g., the input device 100, 200, or 300). Further, the chip size of the processing system 110 may be reduced as compared to processing systems that include dedicated slew rate control circuitry.

In various embodiments, reducing the EMI of an input device may also increase the applicability of an input device (e.g., the input device 100, 200, and/or 300). For example, reducing the EMI emitted by the input device (e.g., the input device 100, 200, and/or 300), may increase the number of electronic systems (e.g., personal computing devices, mobile phones, tablets, automobiles, and the like) within which the input device may be included. In various embodiments, driving the data lines 240 with the constant voltage during the portion 522 of the non-display update period 520 minimizes the EMI generated when driving the input device 100 in one or more radio bands. The radio bands may be amplitude modulation (AM) and frequency modulation (FM) radio bands, among others.

At operation 430, a guard signal is output by a source driver. For example, the source drivers 220a, 220b output a guard signal 542 during the portion 526 of the non-display update period 520. In one embodiment, the source driver 220 is coupled to one or more data lines 240 during the portion 526 of the non-display update period 520. For example, at operation 432 the data lines 240 are coupled to a corresponding one of the source driver 220a, 220b. Accordingly, the one or more data lines 240 are driven with the guard signal 542 during the portion 526 of the non-display update period 520. In one embodiment, the control signals 550, 552, and 554 are set to a high voltage during the portion 526 of the non-display update period 520, providing an indication to the selection mechanisms 230 to couple the data lines 240 with the source drivers 220.

In various embodiments, at operation 434, the selection mechanisms 230 decouple the data lines 240 from the source drivers 220. For example, the selection mechanisms 230 decouple the data lines 240 from the source drivers 220 during the portion 526 of the non-display update period 520. Decoupling the data lines 240 from the source drivers 220 electrically floats the data lines 240. Further, as the electrically floated data lines 240 are capacitively coupled to the sensor electrodes 350 and/or the traces 360, the data lines 240 are modulated with the sensing signal 510 during the portion 526 of the non-display update period 520 via the capacitive coupling. In one embodiment, the control signals 550, 552, and 554 are set to a low voltage during the portion 526 of the non-display update period 520, providing an indication to the selection mechanisms 230 to decouple the data lines 240 from the source drivers 220.

The method 400 may include one of the operation 432 and 434. For example, in one embodiment, the method 400 includes the operation 432 and the operation 434 is omitted. In another embodiment, the method 400 includes the operation 434 and the operation 432 is omitted.

At operation 440, a constant voltage is driven on a data line by a source driver. For example, the source driver 220a may drive the constant voltage 544 on one or more of the data lines 240a, 240b and 240c during the portion 524 of the non-display update period 520. The constant voltage 544 may be a DC voltage. Further, the constant voltage 544 may be greater than, less than, or equal to the constant voltage 516. In one or more embodiments, the constant voltage 546 may be greater than, less than, or equal to the constant voltage 540. In one embodiment, operation 440 includes operation 442, coupling each data line 240 to a corresponding source driver 220. For example, each selection mechanism 230a, 230b couples the associated data lines 240 with a corresponding one of source drivers 220a, 220b during the portion 524 of the non-display update period 520. In one embodiment, the control signals 550, 552, and 554 remain high during the portion 524 of the non-display update period 520, providing an indication to the selection mechanisms 230a to couple the data lines 240a, 240b and 240c to the source driver 220a. In one embodiment, the number of control signals may correspond to the number of data lines 240 coupled to each selection mechanism 230. In one embodiment, the selection mechanisms 230 couple less than the total number of available data lines 240 to each source driver 220 during the portion 524 of the non-display update period 520.

The source drivers 220a, 220b drive the constant voltage 544 onto each of the corresponding data lines 240 that are coupled to each source driver 220a, 220b. In one embodiment, driving one or more of the data lines 240 with the constant voltage 544 alters the slew rate of the transition between the constant voltage and the common voltage 512 on the sensor electrode 350a as is described above with regard to driving constant voltage 540 on the data lines 240 during the portion 522 of the non-display update period 520.

Thus, the embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

What is claimed is:

1. A processing system for an input device, the processing system comprising:
 a driver configured to:
  drive a sensor electrode with a sensing signal during a first portion of a non-display update period of a display frame, wherein the sensing signal comprises a varying voltage;
  drive the sensor electrode with a first constant voltage during a first display period of the display frame and a second display period of the display frame for display updating, wherein the non-display update period occurs between the first display period and second display period; and drive the sensor electrode with a second constant voltage during at least one of a second portion of the non-display update period and a third portion of the non-display update period, wherein the first portion of the non-display update period occurs after the second portion of the non-display update period and before the third portion of the non-display update period, and wherein the first constant voltage is different than the second constant voltage; and a source driver configured to drive a first data line of a display panel with a third constant voltage during at least one of the second portion of the non-display update period and the third portion of the non-display update period.

2. The processing system of claim 1, wherein the source driver is further configured to output a guard signal during the first portion of the non-display update period, wherein the guard signal mitigates capacitive coupling between the source driver and the sensor electrode.

3. The processing system of claim 2, wherein the guard signal comprises at least one selected from the group of a frequency, phase and amplitude in common with the sensing signal.

4. The processing system of claim 1, wherein the third constant voltage differs from the second constant voltage.

5. The processing system of claim 2, wherein outputting the guard signal during the first portion of the non-display update period comprises outputting the guard signal onto the first data line.

6. The processing system of claim 2, wherein the source driver is selectively coupled to the first data line during the second portion and the third portion of the non-display update period and is selectively decoupled from the first data line during the first portion of the non-display update period, and wherein the first data line is electrically floated during the first portion of the non-display update period.

7. The processing system of claim 6, wherein the source driver is further:

selectively coupled to a second data line of the display panel during the second portion and the third portion of the non-display update period; and selectively decoupled from the second data line during the first portion of the non-display update period, and wherein the second data line is electrically floated during the first portion of the non-display update period.

8. An input device, comprising:

a plurality of data lines of a display panel;

a plurality of sensor electrodes; and a processing system, the processing system configured to:

drive a sensor electrode of the plurality of sensor electrodes with a sensing signal during a first portion of a non-display update period of a display frame, wherein the sensing signal comprises a varying voltage;

drive the sensor electrode with a first constant voltage during a first display period of the display frame and a second display period of the display frame for display updating, wherein the non-display update period occurs between the first display period and second display period; and drive the sensor electrode with a second constant voltage during at least one of a second portion of the non-display update period and a third portion of the non-display update period, wherein the second constant voltage is different than the first constant voltage, and wherein the first portion of the non-display update period occurs after the second portion of the non-display update period and before the third portion of the non-display update period; and output a guard signal during the first portion of the non-display update period, wherein the guard signal mitigates capacitive coupling between the processing system and the sensor electrode.

9. The input device of claim 8, wherein the processing system is further configured to drive a first data line of the plurality of data lines with a third constant voltage during at least one of the second portion of the non-display update period and the third portion of the non-display update period.

10. The input device of claim 8, wherein the guard signal comprises at least one selected from the group of a frequency, phase and amplitude in common with the sensing signal.

11. The input device of claim 9, wherein outputting the guard signal during the first portion of the non-display update period comprises outputting the guard signal onto the first data line.

12. The input device of claim 9, further comprising a selection mechanism configured to:

selectively couple the processing system with the first data line during the second portion and the third portion of the non-display update period; and selectively decouple the processing system with the first data line during the first portion of the non-display update period, wherein the first data line is electrically floated during the first portion of the non-display update period.

13. The input device of claim 12, wherein the selection mechanism is further configured to:

selectively couple the processing system with a second data line of the plurality of data lines during the second portion and the third portion of the non-display update period; and selectively decouple the processing system with the second data line during the first portion of the non-display update period, wherein the second data line is electrically floated during the first portion of the non-display update period.

14. A method for input sensing comprising:

driving a sensor electrode with a sensing signal during a first portion of a non-display update period of a display frame, wherein the sensing signal comprises a varying voltage;

driving the sensor electrode with a first constant voltage during a first display period of the display frame and a second display period of the display frame for display updating, wherein the non-display update period occurs between the first display period and the second display period;

driving the sensor electrode with a second constant voltage during at least one of a second portion of the non-display update period and a third portion of the non-display update period, wherein the second constant voltage is different than the first constant voltage, and wherein the first portion of the non-display update period occurs after the second portion of the non-display update period and before the third portion of the non-display update period; and driving a first data line of a display panel with a third constant voltage during at least one of the second portion of the non-display update period and the third portion of the non-display update period.

15. The method of claim 14, further comprising outputting a guard signal during the first portion of the non-display update period, wherein the guard signal mitigates capacitive coupling between a source driver and the sensor electrode.

16. The method of claim 15, wherein the guard signal comprises at least one selected from the group of a frequency, phase and amplitude in common with the sensing signal.

17. The method of claim 15, wherein outputting the guard signal during the first portion of the non-display update period comprises outputting the guard signal onto the first data line.

18. The method of claim 15, further comprising:
selectively coupling the first data line with the source driver during the second portion and the third portion of the non-display update period.

19. The method of claim 18, further comprising:
selectively decoupling the first data line from the source driver during the first portion of the non-display update period, and wherein the first data line is electrically floated during the first portion of the non-display update period.

20. The method of claim 18, further comprising:
selectively coupling a second data line of the display panel with the source driver during the second portion and the third portion of the non-display update period; and
selectively decoupling the second data line from the source driver during the first portion of the non-display update period, and wherein the second data line is electrically floated during the first portion of the non-display update period.

\* \* \* \* \*